Feb. 7, 1939.  J. L. VISCOUNT  2,146,318
FRAME OR KNOCK-DOWN DISPLAY DEVICE
Filed Oct. 12, 1937
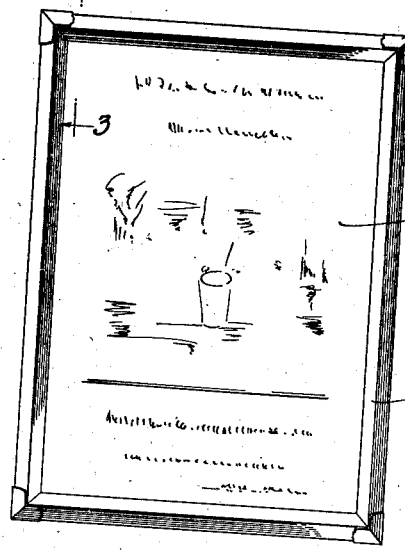
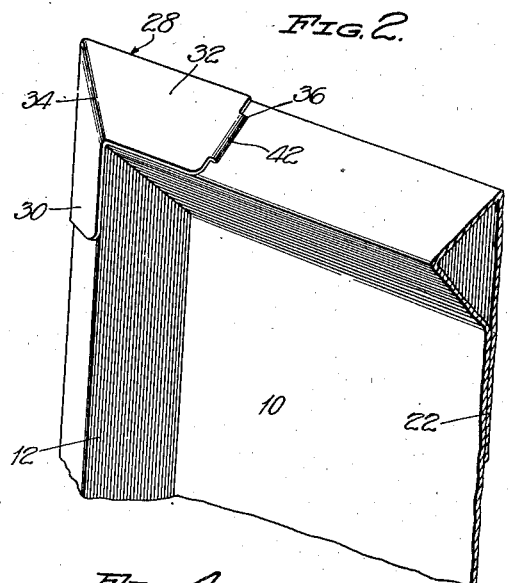
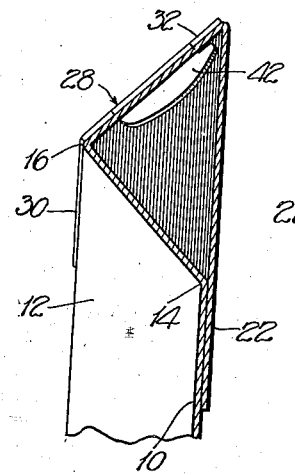
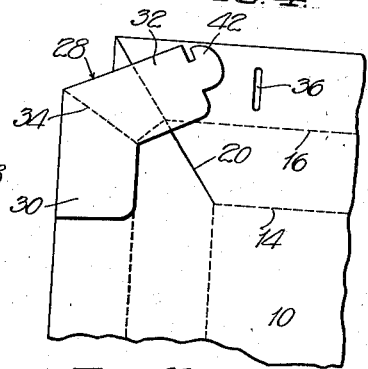
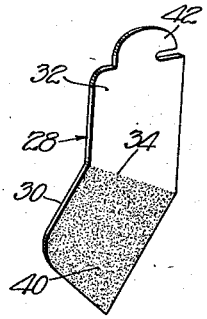
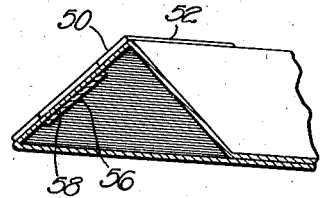
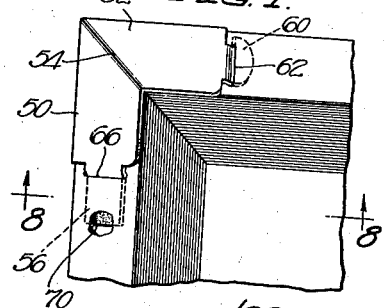
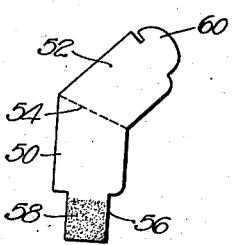
JOSEPH L. VISCOUNT.
INVENTOR.
BY Ely Pattison
ATTORNEYS.
WITNESS:

Patented Feb. 7, 1939

2,146,318

UNITED STATES PATENT OFFICE 2,146,318

FRAME OR KNOCK-DOWN DISPLAY DEVICE

Joseph L. Viscount, Pelham Manor, N. Y., assignor to Snyder & Black, Incorporated, New York, N. Y., a corporation of New York Application October 12, 1937, Serial No. 168,577

2 Claims. (Cl. 40—154)

This invention relates to improvements in display devices and more particularly it pertains to display devices of the knockdown type.

A feature of the invention resides in a novel construction in advertising display devices of the type which include a main panel defined by border which projects beyond the plane of the main panel.

A further feature of the invention resides in a novel construction whereby the device will be easy to erect or knockdown as the case may be, and which will be firmly retained in its erected position.

Other features of the invention will become apparent as the nature thereof is better understood and reference will now be had to the accompanying drawing, in which, Figure 1 is a view in elevation of a display device constructed in accordance with one form of the invention, Figure 2 is a fragmentary perspective view thereof on an enlarged scale, Figure 3 is a detail sectional view on an enlarged scale, taken substantially on the line 3—3 of Figure 1.

Figure 4 is a detail view on an enlarged scale illustrating the manner of manipulating the construction of the invention, Figure 5 is an edge view looking towards the left-hand side of Figure 4, Figure 6 is a detail perspective view, Figure 7 is a fragmentary plan view of a modified form of the invention, Figure 8 is a transverse sectional view on an enlarged scale taken substantially on the line 8—8 of Figure 7, and;

Figure 9 is a detail perspective view showing the tab employed in the modified form.

A display device constructed in accordance with the present invention consists of a main or front panel which is intended for carrying advertising copy, which panel is surrounded or bordered by an upstanding beveled frame which is of inverted V cross sectional shape.

The device is so constructed that the beveled border may be knocked down into a plane to substantially that of the front panel to provide a flat package for shipping and also it may be set up to define a beveled frame or border for the front panel.

In the drawing, the front panel is designated 10, the frame or border being designated 12.

The device, except for the fastening means which retains the device in set-up position is preferably formed from a single piece of material such as cardboard which is scored along the lines 14 to provide trapezoidal panels bordering and hinged to the side edges of the main panel 10. The blank is cut at the corners along diagonal lines designated by the reference character 20 to separate the trapezoidal panels from one another in order that they may be folded along the scored or creased line 14 and a crease or score line 16 which divides each trapezoidal panel into two sections to form the beveled border heretofore mentioned.

When the trapezoidal panels are folded or hinged about the scored or creased lines 14 and 16, the two sections of each panel assume angular relation to each other as best illustrated in Figures 2 and 3 and when in this position, there is an extended flap 22, which engages the rear face of the front or main panel 10, when the device is set-up in display position.

Means is provided to retain the device in set-up position and this means consists of ornamental corner elements 28. There is one of these corner elements 28, for each corner of the device and they are adapted to bridge around the corner of the beveled frame in a manner to be hereinafter described.

Each corner element comprises two wings 30 and 32 which are adapted for hinged movement relatively to each other substantially on the line 34. There is one of these corner elements secured to each trapezoidal panel at one end of the panel, preferably upon the outer section thereof and in the opposite end of each panel, there is a slot 36. The corner elements are secured to their respective trapezoidal panels by means of a suitable adhesive 40, see Figure 6.

The wing section 32 of each corner element is formed with a locking tongue 42 which is adapted to engage the slot 36 in the immediately adjacent trapezoidal panel and when the locking tongues are engaged with their respective slots 36, the sections of the trapezoidal panels will be retained in position to form the beveled border 12, and when said locking tongues are disengaged with their respective slots 36, the device may be knocked down to flat form for shipment.

In the modified form of the invention illustrated in Figures 7 to 9 inclusive, the corner elements comprise two wing-like sections 50 and 52, which are adapted to hinge upon a scored or creased line 54, in order that the corner elements may bridge the joint between the trapezoidal panels and conform to the shape of the beveled frame when the device is set-up for display.

The corner elements, in this form of the invention, are provided with an extension 56, projecting from the wing 50, which extension carries an adhesive 58 for securing the corner element to its respective trapezoidal panel. A locking tongue 60 is provided upon the end of the wing 52 and this locking tongue is adapted for interlocking engagement with a slot 62, in the immediately adjacent trapezoidal panel when the device is set-up in display position.

In this modified form of the invention, the corner elements are secured to their respective panels by passing the extension 56 of each corner element through a slot 66, in the outer section of its respective trapezoidal panel with the adhesive side thereof uppermost in such position that it may be adhesively secured to the inner face of the trapezoidal panel as illustrated at 70, in Figure 7.

The corner elements are preferably of ornamental form and provide an ornamental finish to the device when it is in its set-up form. In addition to serving as ornamental, as well as securing means to retain the beveled border or frame in set-up position, the corner elements serve to hide the joint between the outer sections of the trapezoidal panels when the device is set-up for display and also serve as bracing elements for the corners of the beveled frame.

From the foregoing, it is apparent that the present invention provides a display device of the aforementioned character which is possessed of highly ornamental characteristics, is simple and cheap of construction and which may be easily set-up and knocked down as occasion may require.

Having thus described the invention, what is claimed as new, is:

1. A cardboard knockdown display device comprising a front panel, a trapezoidal panel hinged to each of the side edges of said front panel and adapted conjointly to define a beveled border for said front panel, a slot formed in each end of each of said trapezoidal panels, a corner element, a tongue projecting from said corner element for reception in one of the slots of a trapezoidal panel to provide means for fixedly securing said corner element to one of said trapezoidal panels, and a second tongue projecting from said corner element for reception in a slot in an adjacent trapezoidal panel to position the trapezoidal panels in setup border forming position.

2. A cardboard knockdown display device comprising a front panel, a trapezoidal panel hinged to each of the side edges of said front panel and adapted conjointly to define a beveled border for said front panel, a slot formed in each end of each of said trapezoidal panels, a plurality of corner elements, there being one for each trapezoidal panel, a tongue projecting from each corner element adapted to pass through one slot in a trapezoidal panel to the rear face thereof, means for securing said tongue to the rear face of its respective trapezoidal panel, and a second tongue projecting from each corner element for interlocking engagement with a slot in an adjacent trapezoidal panel to retain the trapezoidal panels in position to form the beveled border for the front panel.

JOSEPH L. VISCOUNT.